(12) United States Patent
Souvestre (10) Patent No.: US 10,371,306 B2
(45) Date of Patent: Aug. 6, 2019

(54) PIPE-INSPECTION DEVICE PROPELLED BY AN ARCHIMEDES SCREW

(71) Applicant: COMMISSARIAT A L'ENERGIE ATOMIQUE ET AUX ENERGIES ALTERNATIVES, Paris (FR)

(72) Inventor: Florent Souvestre, Orsay (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 86 days.

(21) Appl. No.: 15/570,778

(22) PCT Filed: Sep. 9, 2015

(86) PCT No.: PCT/EP2015/070612
§ 371 (c)(1),
(2) Date: Oct. 31, 2017

(87) PCT Pub. No.: WO2016/177436
PCT Pub. Date: Nov. 10, 2016

(65) Prior Publication Data
US 2018/0119868 A1    May 3, 2018

(30) Foreign Application Priority Data

May 7, 2015   (FR) ...................................... 15 54098

(51) Int. Cl.
*B63H 1/12*        (2006.01)
*B63H 19/08*       (2006.01)
(Continued)

(52) U.S. Cl.
CPC ................ *F16L 55/32* (2013.01); *B63H 1/12* (2013.01); *B63H 19/08* (2013.01); *B63H 21/17* (2013.01);
(Continued)

(58) Field of Classification Search
CPC ................ B63H 1/12; B63H 2001/122; B63H 2001/125; B63H 2001/127; B63H 19/08;
(Continued)

(56) References Cited

U.S. PATENT DOCUMENTS 4,676,310 A    6/1987   Scherbatskoy et al.
5,509,370 A *  4/1996   Kovacs ................ B60F 3/0023
                                              180/7.2
(Continued)

FOREIGN PATENT DOCUMENTS

DE    10 2004 006 855 A1   9/2005
JP         2005-84412 A    3/2005
(Continued)

OTHER PUBLICATIONS

International Search Report dated Oct. 22, 2015 in PCT/EP2015/070612 filed Sep. 9, 2015.
(Continued)

*Primary Examiner* — Ajay Vasudeva
(74) *Attorney, Agent, or Firm* — Oblon, McClelland, Maier & Neustadt, L.L.P.

(57) ABSTRACT

A robotic device for inspecting a pipe includes at least one pair of propulsion elements each including a rotary drum, an outer surface of which has a screw thread. The device also includes a body associated with at least one pair of propulsion elements and in which are inserted sensor, at least one pair of electric motors each capable of rotating a rotary drum, and at least one pair of electric power sources each capable of powering an electric motor. The body is shaped such that a ventral portion and a dorsal portion of the device are symmetrical with one another relative to a median frontal plane of the device, thus allowing the device to move indistinctly on the belly or on the back.

14 Claims, 6 Drawing Sheets

(51) Int. Cl.
*B63H 21/17* (2006.01)
*F16L 55/32* (2006.01)
*F16L 55/40* (2006.01)
G21C 17/017 (2006.01)
F16L 101/30 (2006.01)

(52) U.S. Cl.
CPC ........ *F16L 55/40* (2013.01); *B63H 2001/125* (2013.01); *F16L 2101/30* (2013.01); *G21C 17/017* (2013.01)

(58) Field of Classification Search
CPC ....... B63H 21/17; B08B 9/049; B60F 3/0023; B62D 57/036; F16L 55/28; F16L 55/30; F16L 55/32; F16L 55/40
USPC ........................ 440/12.65, 12.67, 98; 180/7.2
See application file for complete search history.

(56) References Cited

U.S. PATENT DOCUMENTS

| | | | |
|---|---|---|---|
| 6,880,195 B1 | 4/2005 | Bahari et al. | |
| 10,076,938 B2 * | 9/2018 | Olmedo | B60F 3/0023 |

FOREIGN PATENT DOCUMENTS

| | | | | |
|---|---|---|---|---|
| WO | 00/63806 A1 | 10/2000 | | |
| WO | WO 2009043570 A1 * | 4/2009 | | B63H 19/08 |

OTHER PUBLICATIONS

French Search Report dated Aug. 12, 2015 in FR 1554098 filed May 7, 2015.

\* cited by examiner

PIPE-INSPECTION DEVICE PROPELLED BY AN ARCHIMEDES SCREW

TECHNICAL FIELD

The field of the invention is that of robotic devices for inspecting pipes such as waste water and rain water pipes or industrial pipes. The invention more particularly relates to a device propelled by means of an Archimedes screw capable of moving inside pipes in the presence of water, sand, grease or sludge, and having the advantage of tolerating being accidentally flipped over.

PRIOR ART

Mobile mechatronic devices are used to move inside district or industrial network pipes in order to perform an inspection, in particular by taking photographs.

The locomotive function of such devices is generally provided by wheels or tracks. However, in order to prevent situations in which such devices become blocked, the pipe must generally be cleaned out using a high-pressure jet before the passage of the device. Moreover, in the event that the device is flipped over, for example as a result of the presence of an obstacle, the device can no longer continue to move forward and must be manually recovered. These cleaning and recovery operations generate significant costs.

Devices driven by means of an Archimedes screw have been developed in order to move on wet or damp terrain such as sludge, snow or water, as well as on hard ground. This ability to advance, regardless of the type of environment encountered, makes it an all-terrain locomotive mode able to move inside pipes.

The Steady Flux Inc. company thus proposes a device called CBOR, for inspecting pipes and implementing such a propulsion system using an Archimedes screw. Said device comprises a pair of propulsion elements, each of which includes a rotary drum, an outer surface of which has an Archimedes screw thread, and a central module coupled to each of the propulsion elements by means of support arms. As a result of the design thereof with a central module positioned above the propulsion elements, said device does not tolerate being accidentally flipped over "onto its back". In such a case, a manual recovery operation is still necessary.

DESCRIPTION OF THE INVENTION

The purpose of the invention is therefore to provide a mobile pipe-inspection device that is both an all-terrain device, in that it can advance regardless of the environment encountered in the pipes, and that is capable of continuing to advance despite being accidentally flipped onto its back.

The invention therefore relates to a robotic device for inspecting a pipe, comprising at least one pair of propulsion elements each including a rotary drum, an outer surface of which has an Archimedes screw thread. The propulsion elements of a pair extend in a longitudinal direction such that they are symmetrical with one another relative to a median sagittal plane of the device.

The device further comprises a body associated with the at least one pair of propulsion elements and in which are inserted at least one sensor, at least one pair of electric motors, each capable of rotating a rotary drum, and at least one pair of electric power sources, each capable of powering an electric motor. The body is shaped such that a ventral portion and a dorsal portion of the device are symmetrical with one another relative to a median frontal plane of the device, thus allowing the device to be displaced indifferently on its front or on its back by means of the at least one pair of propulsion elements.

Some preferred, however non-limiting aspects of said device are as follows:
- the propulsion elements are floats;
- the threading present on the outer surface of a rotary drum comprises angular portions of a zero height at angular intervals of 360°;
- the body further comprises a receptacle for a control circuit board;
- it comprises a first and a second pair of propulsion elements arranged such that they are symmetrical with one another relative to a median transverse plane of the device;
- the body comprises at least one pair of cylindrical portions having a diameter that is less than that of the rotary drums, the cylindrical portions of a pair extending in the longitudinal direction and being connected to one another by a transverse junction portion that has a height in the median sagittal plane that is less than the diameter of the rotary drums, and the body further comprises a compartment in which is housed the at least one sensor, the compartment extending from the junction portion in the longitudinal direction between the propulsion elements;
- each cylindrical portion forms a longitudinal recess mounted inside a rotary drum and designed to receive an electric motor capable of rotating the corresponding rotary drum and an electric power source capable of powering the electric motor;
- the body comprises a pair of cylindrical portions, and the transverse junction portion comprises a pair of transverse recesses, each designed to receive an electric motor, at least one electric power source being housed in the compartment.

The invention further relates to the use of the device to inspect a pipe.

BRIEF DESCRIPTION OF THE FIGURES

Other aspects, purposes, advantages and characteristics of the invention shall be better understood upon reading the following detailed description given of the non-limiting preferred embodiments of the invention, provided for illustration purposes, with reference to the appended figures, in which.

DETAILED DESCRIPTION OF THE SPECIFIC EMBODIMENTS

In the different figures, identical elements bear the same reference numerals.

The invention relates to a robotic device for inspecting a pipe, such as a district network pipe or a pipe of an industrial plant.

The device is propelled by Archimedes screws driven in rotation using direct drive motors. Such a propulsion system allows the device to be an all-terrain device in that it can move forwards inside a pipe, regardless of the environment encountered, whether it is in contact with the bottom of the pipe or in the presence of water, sludge, grease or sand.

Figure 1:
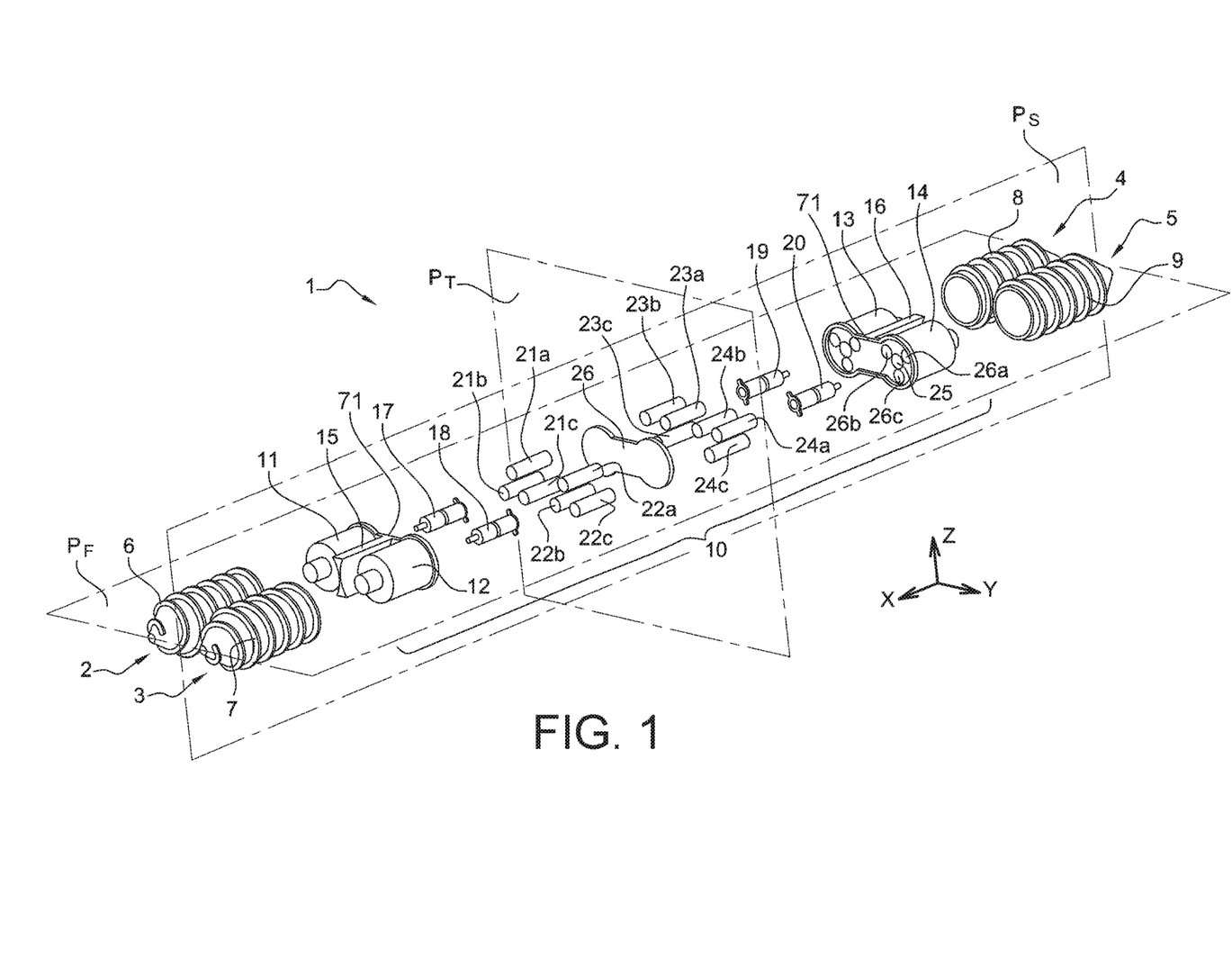
FIG. 1 shows an exploded view of a device according to a first possible embodiment of the invention.
Figure 4:
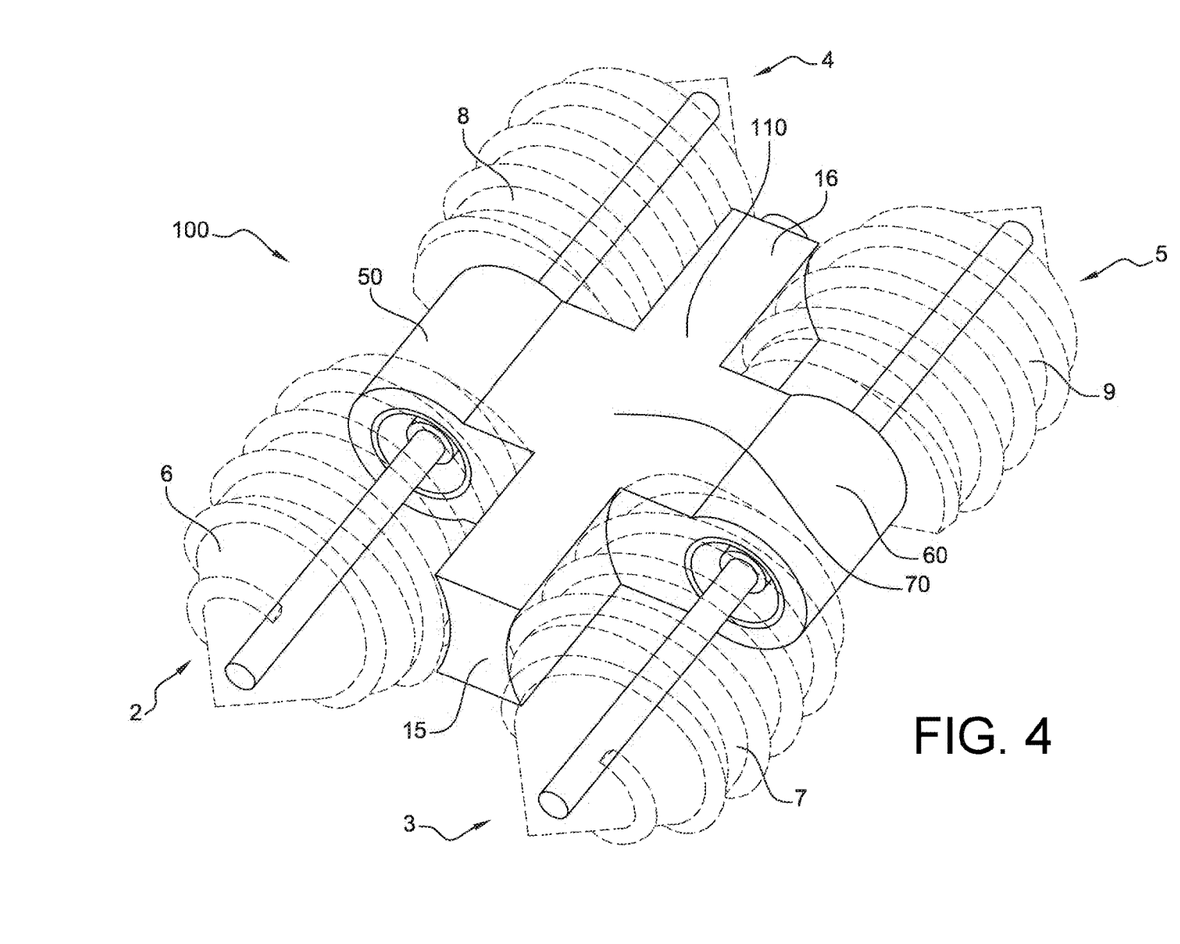
FIGS. 4 and 5 show a device according to a second possible embodiment of the invention.

FIGS. 1 and 4 show two possible embodiments of a device 1, 100 according to the invention. The device 1, 100 comprises at least one pair of propulsion elements 2, 3; 4, 5, each including a rotary drum 6, 7; 8, 9, an outer surface of which has an Archimedes screw thread.

The propulsion elements of a pair extend in a longitudinal direction, along the X-axis, such that they are symmetrical with one another relative to a median sagittal plane $P_S$ of the device. The median sagittal plane $P_S$ of the device is understood as being a vertical plane (Z-axis) relative to the ground (X-Y plane) extending in the longitudinal direction of the device while separating the left half from the right half.

Each rotary drum typically assumes the shape of a hollow cylinder, open at a first end and ending at the other end thereof by a cone.

The threading of a pair of rotary drums 6, 7; 8, 9 is such that one has left-hand threading and the other has right-hand threading. For example, the outer surface of the right rotary drum (as shown in the direction of the X-axis) has left-hand threading and the outer surface of the left rotary drum has right-hand threading. When two pairs of drums are used, the right drums can have the same threadings, whereby the left drums therefore have opposite threadings.

In one preferred embodiment, the propulsion elements are floats. For this purpose, the rotary drums are air-tight and sufficient in size (in particular to allow an air pocket to be present where the inner space is unoccupied) in order to allow the device to float on water. In such a scenario, the Archimedes screw threads further allow the device to move on water in the same way as a propeller.

Figure 2:
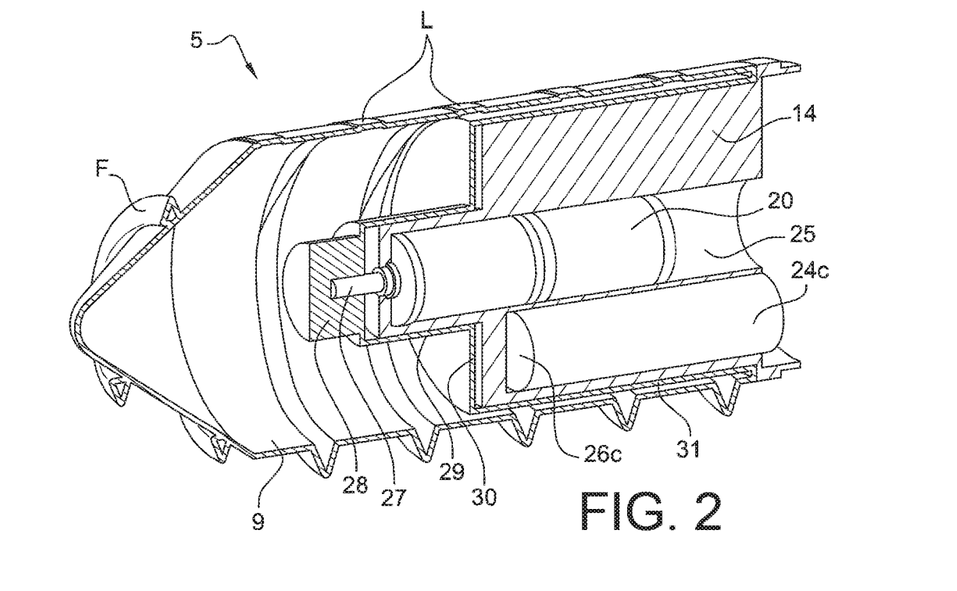
FIG. 2 shows a perspective sectional view of a propulsion element of a device according to the first possible embodiment of the invention.
Figure 3:
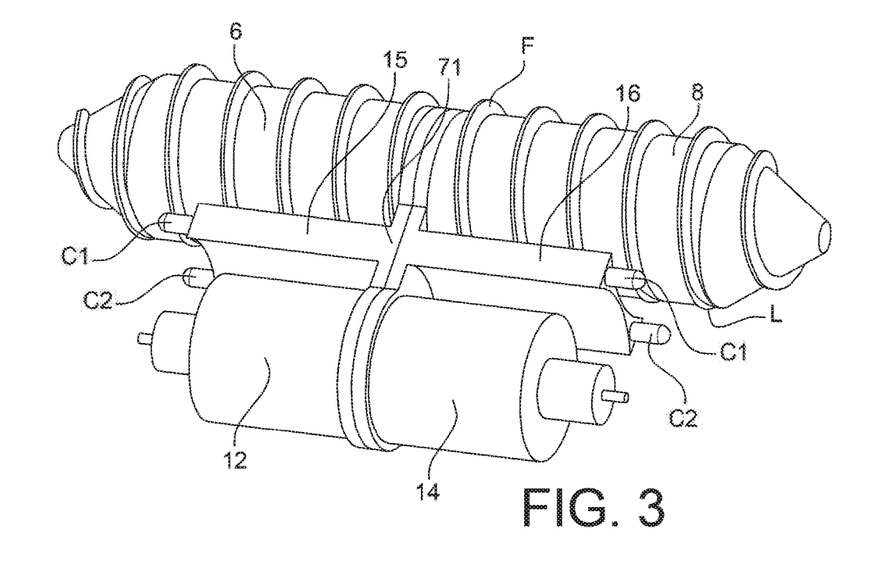
FIG. 3 shows a possible embodiment of an image-capture system embedded in a device according to the invention.

In another preferred embodiment, and as shown in FIGS. 2 and 3, the threading F present on the outer surface of a rotary drum 4, 5 comprises angular portions L having a zero height at angular intervals of 360°. Said angular portions L are therefore evenly distributed along the threading with one angular portion L per thread pitch, at least with regard to the threading located on the cylindrical portion of the rotary drum. For this purpose, the threading can have a variable height with regular regions of reduced height on either side of each of the angular portions L of zero height.

In such a manner, the outer surface of a drum has a smooth strip devoid of threading, that extends in the longitudinal direction. This smooth strip eases the forwards motion of the device by limiting resistance caused by friction with the bottom of the pipe and by minimising draught. The device can therefore allow itself to be carried by the natural water current without consuming power.

The device 1, 100 further comprises a body 10, 110 associated with the at least one pair of propulsion elements and in which are inserted at least one sensor, at least one pair of electric motors, each capable of rotating a rotary drum, and at least one pair of electric power sources, each capable of powering an electric motor.

The at least one sensor can be an image-capture system, for example a camera, in particular a directional camera, or a photographic device. However, the device is not limited to a specific type of sensor, and covers all types of sensors capable of observing a physical magnitude with or without contact with the environment, such as a temperature sensor or a pH sensor.

The body 10, 110 is also shaped such that a ventral portion and a dorsal portion of the device are symmetrical with one another relative to a median frontal plane $P_F$ of the device. The median frontal plane $P_F$ of the device is understood as being a plane parallel to the ground, perpendicular to the median sagittal plane $P_S$, and separating the lower or ventral half of the device from the upper or dorsal half of the device. As a result of this geometric configuration, the device tolerates being accidentally flipped over as it can move both "on its front" and "on its back" by means of the at least one pair of propulsion elements.

As shown in FIGS. 1 and 4, the body 10, 110 can comprise at least one pair of cylindrical portions 11, 12, 13, 14, 50, 60 having a diameter that is less than that of the rotary drums 6, 7, 8, 9. The cylindrical portions of a pair extend in the longitudinal direction and are each arranged coaxially with a rotary drum of a pair of propulsion elements. They are connected to one another by a transverse junction portion 71, 70 that has a height in the median sagittal plane $P_S$ that is less than the diameter of the rotary drums. The cylindrical portions and the junction portion thus form an assembly that has the overall shape of a pair of binoculars.

The body 10, 110 further comprises a compartment 15, 16 in which the at least one sensor is housed. The compartment 15, 16 extends from the transverse junction portion 71, 70 in the longitudinal direction between the propulsion elements 2, 3; 4, 5.

The at least one sensor is therefore received in a space located between the propulsion elements, the dimension of which along the Z-axis is less than or equal to the diameter of the rotary drums. The dimension along the Y-axis can vary in planes parallel to the median frontal plane $P_F$ in order to allow the rotary drums to be close to one another and thus improve compactness. In particular, the dimension along the Y-axis can be minimal at the level of the median frontal plane $P_F$, then can gradually increase in the upwards direction, or respectively in the downwards direction, relative to the device, as the distance from said median front plane $P_F$ grows, said gradual increase allowing it to mould to the cylindrical contour of the rotary drums.

In a first embodiment shown in FIGS. 1 to 3, an electric motor and a power source are associated with each of the rotary drums and arranged inside the corresponding rotary drum.

In this first embodiment, each cylindrical portion of a pair of cylindrical portions of the body 10 forms a longitudinal recess 11, 12; 13, 14 designed to receive an electric motor 17, 18; 19, 20 capable of rotating the corresponding rotary drum and an electric power source 21a-21c, 22a-22c; 23a-23c, 24a-24c capable of powering the electric motor.

Each longitudinal recess 11, 12; 13, 14 of a pair is mounted inside a rotary drum 6, 7; 8, 9 of a pair of propulsion elements such that the compartment 15; 16 is arranged between the propulsion elements 2, 3; 4, 5 at the level of the median sagittal plane $P_S$.

An electric motor and an electric power source are thus incorporated into each rotary drum, and the at least one sensor is arranged between the drums. Therefore, the device does not require one or more additional modules in order to receive said elements, and the outer shape thereof corresponds to that of the rotary drums. Therefore, the device is symmetrical relative to a median frontal plane $P_F$ of the device.

As shown in FIG. 1, a rotary drum assumes the shape of a hollow cylinder, open at a first end in order to receive a recess, and ending at the other end thereof by a cone. A longitudinal recess has a cylindrical shape complementary to that of the drum in order to be able to engage therein. A longitudinal recess can in particular be formed from a cylindrical base below a cylinder of a smaller diameter.

The body 10 has a base supporting a pair of recesses 11, 12 and a compartment 15, the base capable of including a receptacle for a control circuit board 26 for the electric power source of the electric motor and of the sensor.

In order to authorise the highest degree of freedom possible and allow the device to move in all directions, the different rotary drums are driven independently by electric motors capable of running in both directions.

FIG. 3 shows one embodiment wherein each compartment 15, 16 can receive two sensors, for example two cameras C1, C2. A first camera C1 can be directed upwards, whereas the second camera C2 can be directed downwards (and vice-versa depending on whether the device is moving on its front or back). In another embodiment, each compartment 15, 16 receives three cameras with, in addition to the two cameras C1, C2 directed upwards and downwards, an additional camera directed forwards, or respectively backwards, the optical axis of which is parallel to the axis of revolution of the pipe.

The electric power source of a motor can include a plurality of batteries, for example three batteries as shown in FIG. 1. Each longitudinal recess 11-14 of the body 10 thus comprises a space for receiving an electric motor and a space for receiving each of the batteries. Taking the example of the longitudinal recess 14, the spaces 26a, 26b, 26c for receiving the batteries 24a, 24b, 24c can be arranged in an evenly distributed manner along a circumference encircling the space 25 for receiving the electric motor 20.

FIG. 2 shows a perspective view of a section along the median sagittal plane $P_S$ of a propulsion element 5 according to the first possible embodiment of the device according to the invention. The propulsion element 5 comprises the rotary drum 9 into which is inserted the longitudinal recess 14. The longitudinal recess 14 comprises a space 25 for receiving the motor 20 and FIG. 2 shows a space 26c for receiving one of the batteries 24c. The recess 14 is comprised of a cylindrical base beneath a cylinder of smaller diameter forming a shoulder and from which a shaft 27 protrudes, driven in rotation by the motor 20.

The drum 9 has, in the inner volume thereof, a cylindrical driving part 28 that has a bore positioned in an interference fit with the shaft 27 so as to allow the drum 14 to be driven in rotation. The cylindrical driving part 28 is effectively coupled with the outer surface of the drum 9 via walls of a space for receiving the recess 14 in the drum 9. More specifically, a wall 29 is provided, coupled with the cylindrical driving part 28 and moulding to the front portion of the recess 14, a wall 30 is provided, used to abut the shoulder of the recess 14, and a wall 31 is provided, coupled with the outer surface of the drum and extending in the longitudinal direction in order to mould to the shape of the cylindrical base of the recess 14. Said walls 29, 30, 31 define a rear space of a front space within the inner volume of the drum 14. The hollow rear space is used to receive the recess 14 and the front space, which is also hollow, is used as an air pocket to ensure floatation.

In one possible embodiment, the device can comprise only a single pair of propulsion elements and a body equipped with a single pair of longitudinal recesses. In another possible embodiment shown in FIG. 1-3, the device comprises a first and a second pair of propulsion elements arranged such that they are symmetrical with one another relative to a median transverse plane $P_T$ of the device. The median transverse plane is understood as being a plane vertical to the ground, perpendicular to the median sagittal plane $P_S$, and separating the front half of the device from the rear half of the device. Thanks to this third symmetry, the hardiness of the device is improved.

Moreover, the presence of four rotary drums eases the rotation of the device, with a smaller turning radius. It is also accompanied by a distributed power allocation without requiring the use of transmission mechanisms, resulting in improved overall propulsive yield and improved distribution of loads.

In this embodiment, the body 10 comprises two pairs of longitudinal recesses and a sensor received in the compartment 15, 16 arranged between the recesses of each of the pairs, the body being provided at the level of the median transverse plane $P_T$. As shown in FIG. 1, the body can be broken down into two sub-portions that are symmetrical relative to the median transverse plane $P_T$, each sub-portion being dedicated to one of the pairs of propulsion elements.

The receptacle for the control circuit board can be provided at an interface between the two pairs of recesses, for example in a space formed at the connection between the two sub-portions of the body.

Figure 5:
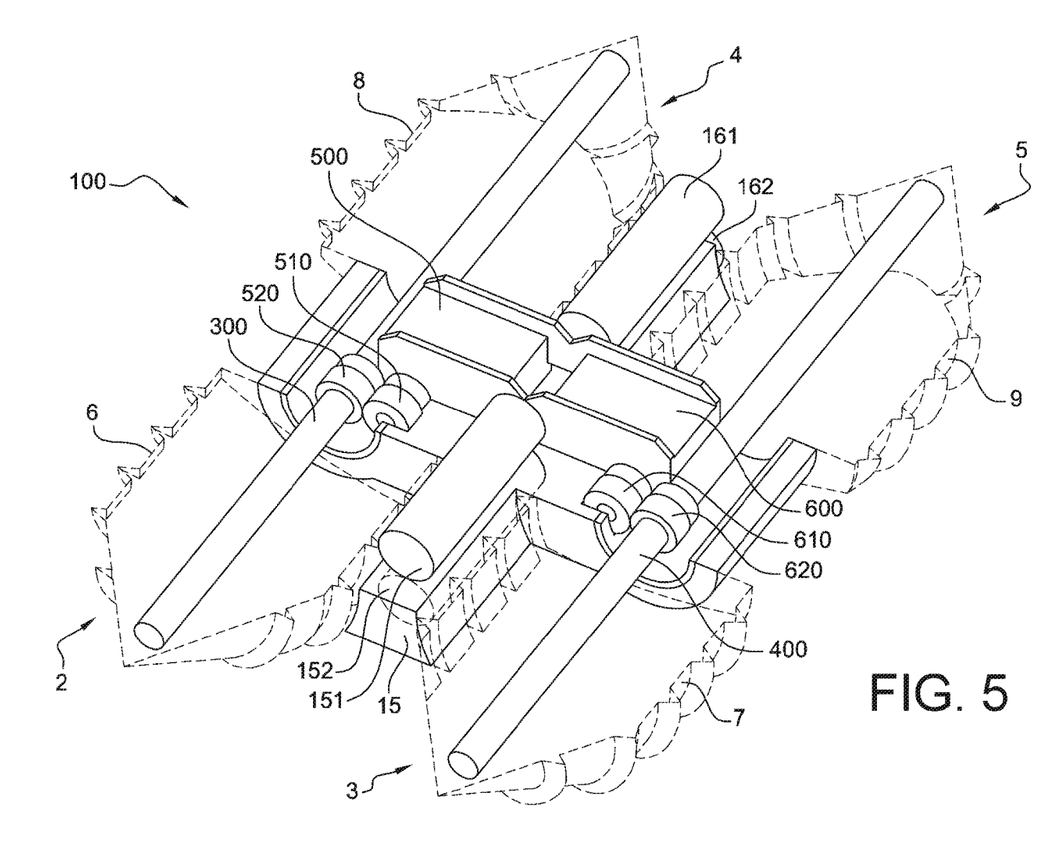

In a second embodiment shown in FIGS. 4 and 5, the electric motors and the power sources thereof are arranged behind a pair of propulsion elements. The motors are more specifically placed back-to-back and each allow one of the rotary drums of a pair of propulsion elements to be rotated.

In this second embodiment, the body 110 comprises a pair of cylindrical portions 50, 60, and the transverse junction portion 70 comprises a pair of transverse recesses, each provided in order to receive an electric motor 500, 600. Within the scope of this embodiment, the at least one electric power source is housed in the compartment 15, 16 that receives the at least one sensor. For example, FIG. 5 shows two batteries 151, 152, 161, 162 for powering each motor 500, 600. The at least one sensor can comprise one or more cameras housed in the compartment in a similar manner to that shown in FIG. 3 and described above.

Also in this second embodiment, the device 100 can include only a single pair of propulsion elements and a body placed behind the pair of elements. However, as shown in FIGS. 4 and 5, in this second embodiment, the device 100 can include and first and a second pair of propulsion elements arranged such that they are symmetrical with one another relative to a median transverse plane $P_T$ of the device. The body 110 is therefore located in the centre of the device, and has a symmetry along each of the planes $P_S$, $P_F$ and $P_T$.

Each motor 500, 600 is coupled to a shaft 300, 400 that is secured to the one or more propulsion elements 2, 4; 3, 5 located on the same side of the median sagittal plane $P_S$ and that extends through each of the cylindrical portions 50, 60 of the body 110. The coupling is provided by the meshing of a part 510, 610 driven in rotation by the motor on a part 520, 620 carried by the shaft. Each shaft 300, 400 is thus driven in rotation by one of the electric motors 500, 600, allowing the one or more rotary drums 6, 8; 7, 9 located on the same side of the median sagittal plane $P_S$ to be rotated.

In each of the embodiments described above, the first and the second pair of propulsion elements can be connected to one another by a hinged mechanism in order to ease the clearance of obstacles. This mechanism can be carried by the body, for example by being inserted between the two aforementioned sub-portions of the body 10 according to the first embodiment of the invention.

Figure 6A:
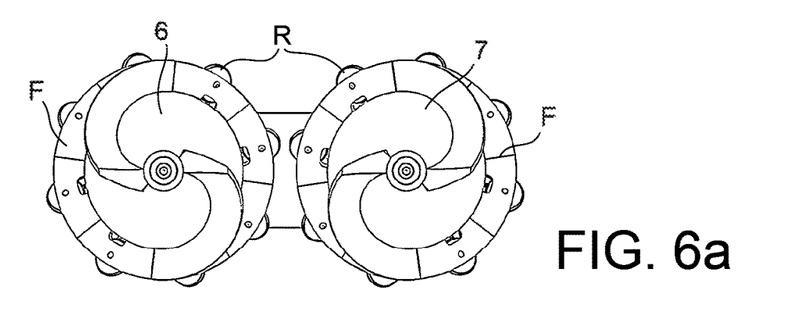
FIGS. 6a, 6b and 6c are views of a device according to an alternative embodiment of the invention, wherein wheels are incorporated into the surface threading of a rotary drum.
Figure 6B:
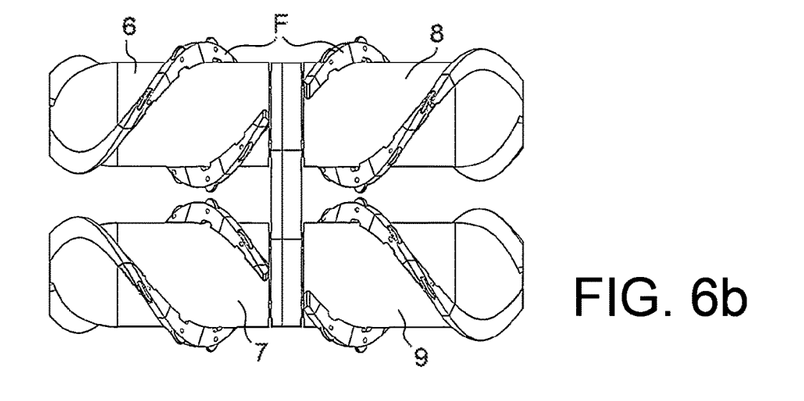
Figure 6C:
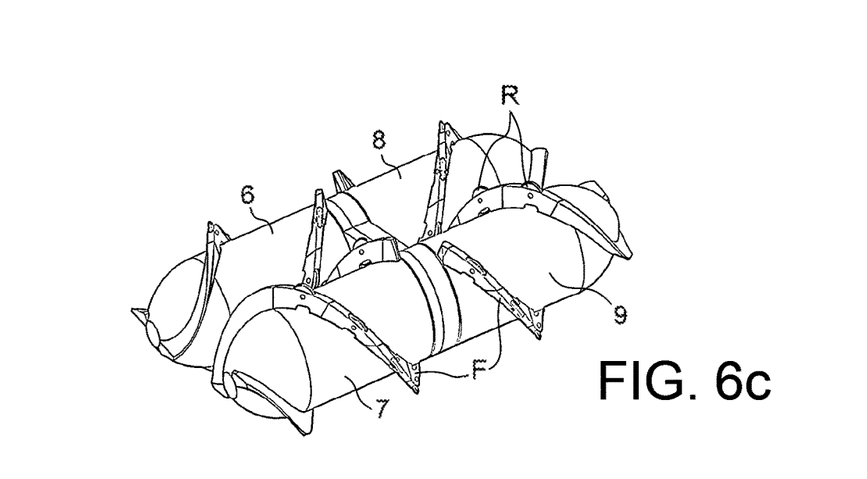

In one alternative embodiment of the invention, wheels are incorporated into the surface threading of a rotary drum. FIGS. 6a, 6b and 6c respectively show front, overhead and perspective views of a device according to this alternative embodiment.

The wheels R are more specifically incorporated into the threading F present on the outer surface of a rotary drum 6, 7; 8, 9 so as to be driven in rotation by a contact with the ground during the rotation of the rotary drum. Therefore, during a forwards trajectory of the device, the wheel in contact with the ground follows a line inclined at an angle that corresponds to the helix angle of the threading. The wheels are thus mounted such that they rotate in the threading about an axis of rotation that is perpendicular to the local direction of the helix of the threading.

The presence of the wheels prevents the threading of the rotary drum from sliding on the ground and thus improves the locomotion of the device, in particular on smooth terrains. The rolling also removes interference stresses as a result of friction from the threading. The wheels can further have a rubbery surface on the periphery thereof, intended to be in contact with the ground, thus providing improved grip.

Figure 7A:
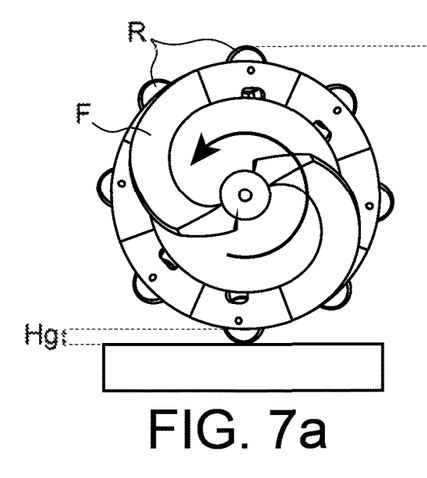
FIGS. 7a and 7b show the vertical movement induced by the presence of wheels in the threading.
Figure 7B:
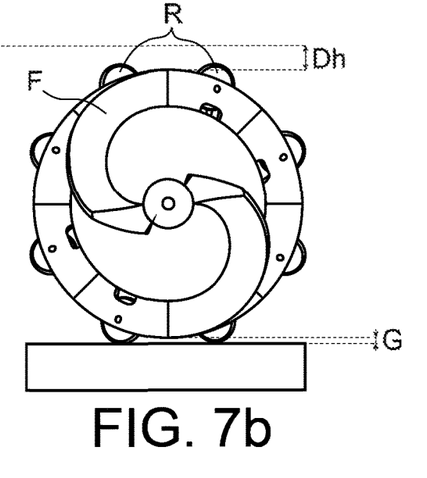

FIGS. 7a and 7b represent the vertical movement induced by the presence of wheels R in the threading F. During the rotation of the rotary drum, the contact with the ground will be successively assured by one (FIG. 7a) and two wheels (FIG. 7b). This results in a vertical movement modelled by Dh, corresponding to the difference in height between the high point and the low point of the rotary drum during the displacement. The greater the number of wheels, the more fluid the movements and the less the vertical flapping.

The ground clearance value G must be greater than zero in order to ensure permanent contact of the wheels with the ground, thus preventing contact of the threading F with the ground. The diameter of a wheel, and therefore the thread protrusion height Hg thereof, is therefore directly linked to the number of wheels. The greater the number of wheels, the more the thread protrusion height Hg can be reduced, and therefore the lower the interference generated when moving on a soft ground.

A high number of wheels therefore provides for a more fluid displacement both on a hard ground and on a soft ground. However, the weight and complexity rise quickly, which leads us to choose, for example, a number of 8 wheels as shown in the figures. Therefore, Dh and Hg are relatively low, for a reasonable degree of complexity.

Figure 8:
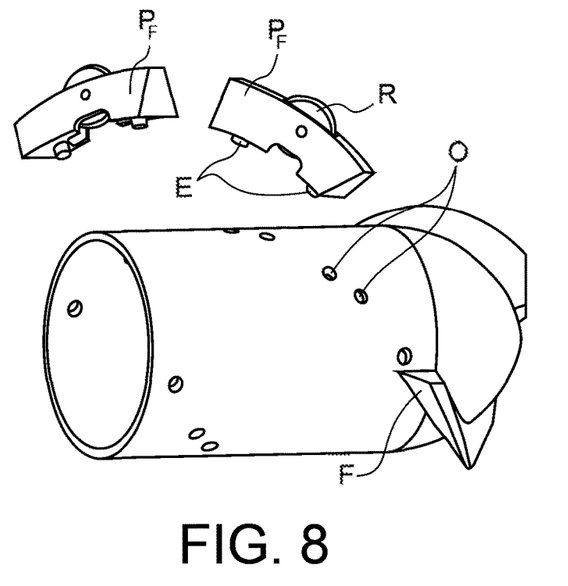
FIG. 8 shows another alternative embodiment of the invention of the device, wherein the threading is mounted in a removable manner on the surface of a rotary drum.

FIG. 8 shows another alternative embodiment of the invention of the device, wherein the threading F is mounted in a removable manner on the outer surface of a rotary drum.

In this alternative, the threading F can comprise a plurality of thread portions Pf and each thread portion is mounted in a removable manner on the outer surface of the rotary drum, for example by interlocking lugs E present on one thread portion in the orifices O provided on the surface of the rotary drum.

The thread portions Pf preferably cover similar angular portions. As shown, thread portions can be provided with one or more wheels in order to procure the aforementioned advantages.

This modular design makes the device easier to maintain (for example when replacing a worn wheel) and provides a certain versatility.

The invention is not limited to the device as described above, however also covers the use thereof for inspecting a pipe.

The invention claimed is:

1. A robotic device for inspecting a pipe, comprising:
at least one pair of propulsion elements each including a rotary drum, an outer surface of each rotary drum having an Archimedes screw thread, the propulsion elements of a pair extending in a longitudinal direction such that they are symmetrical with one another relative to a median sagittal plane of the device,
wherein the robotic device further comprises a body associated with the at least one pair of propulsion elements and in which are inserted at least one sensor, at least one pair of electric motors, each capable of rotating a rotary drum, and at least one pair of electric power sources, each capable of powering an electric motor, the body being shaped such that a ventral portion and a dorsal portion of the robotic device are symmetrical with one another relative to a median frontal plane of the robotic device, thus allowing the robotic device to be displaced indifferently on its front or on its back by the at least one pair of propulsion elements.

2. The robotic device according to claim 1, wherein the propulsion elements are floats.

3. The robotic device according to claim 1, wherein the Archimedes screw thread present on the outer surface of a rotary drum comprises angular portions of a zero height at angular intervals of 360°.

4. The robotic device according to claim 1, wherein the Archimedes screw thread present on the outer surface of a rotary drum is mounted thereon in a removable manner.

5. The robotic device according to claim 4, wherein said Archimedes screw thread comprises a plurality of thread portions, each thread portion being mounted in a removable manner on the outer surface of the rotary drum.

6. The robotic device according to claim 5, wherein the removable mounting includes an interlocking step.

7. The robotic device according to claim 1, wherein wheels are incorporated into the Archimedes screw thread present on the outer surface of a rotary drum so as to be driven in rotation by a contact with the ground during the rotation of the rotary drum.

8. The robotic device according to claim 1, further comprising a first and a second pair of propulsion elements arranged such that they are symmetrical with one another relative to a median transverse plane of the device.

9. The robotic device according to claim 1, wherein the body comprises at least one pair of cylindrical portions having a diameter that is less than a diameter of the rotary drums, the cylindrical portions of a pair extending in the longitudinal direction and being connected to one another by a transverse junction portion that has a height in the median sagittal plane that is less than the diameter of the rotary drums, and wherein the body further comprises a compartment in which is housed the at least one sensor, the compartment extending from the transverse junction portion in the longitudinal direction between the propulsion elements.

10. The robotic device according to claim 9, wherein each cylindrical portion forms a longitudinal recess mounted inside a rotary drum and designed to receive an electric motor capable of rotating the corresponding rotary drum and an electric power source capable of powering the electric motor.

11. The robotic device according to claim 10, wherein the electric power source comprises a plurality of batteries, and wherein each longitudinal recess comprises a space for receiving an electric motor and a space for receiving each of the batteries, the spaces for receiving the batteries being arranged such that they are evenly distributed along a circumference encircling the space for receiving the electric motor.

12. The robotic device according to claim 9, wherein the transverse junction portion comprises a pair of transverse recesses, each designed to receive an electric motor, and wherein at least one electric power source is housed in the compartment.

13. The robotic device according to claim 12, further comprising a first and a second pair of propulsion elements arranged such that they are symmetrical with one another relative to a median transverse plane of the device and a pair of shafts, each coupled to the propulsion elements located on the same side of the median sagittal plane, each shaft being driven in rotation by one of the electric motors.

14. A process for inspecting a pipe, comprising:
displacing the robotic device according to claim 1.

* * * * *